(12) United States Patent  
Yokoyama

(10) Patent No.: US 9,165,227 B2  
(45) Date of Patent: Oct. 20, 2015

(54) COLOR IMAGE FORMING APPARATUS

(71) Applicant: CANON KABUSHIKI KAISHA, Tokyo (JP)

(72) Inventor: Ken Yokoyama, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/772,546

(22) Filed: Feb. 21, 2013

(65) Prior Publication Data
US 2013/0222858 A1 Aug. 29, 2013

(30) Foreign Application Priority Data

Feb. 27, 2012 (JP) .................................. 2012-040341

(51) Int. Cl.
- G06K 15/02 (2006.01)
- H04N 1/407 (2006.01)
- H04N 1/60 (2006.01)
- G03G 15/01 (2006.01)
- G03G 15/00 (2006.01)

(52) U.S. Cl.
CPC ........ G06K 15/1878 (2013.01); G03G 15/0189 (2013.01); G03G 15/5062 (2013.01); H04N 1/4076 (2013.01); H04N 1/6033 (2013.01)

(58) Field of Classification Search
CPC ................................................. G06K 15/1878
USPC ................................................... 358/1.1–1.9
See application file for complete search history.

(56) References Cited

U.S. PATENT DOCUMENTS

| | | | |
|---|---|---|---|
| 5,864,408 A * | 1/1999 | Kumashiro | 358/461 |
| 6,421,146 B1 * | 7/2002 | Yoo | 358/461 |
| 7,239,427 B2 * | 7/2007 | Tezuka et al. | 358/2.1 |
| 2003/0063299 A1 * | 4/2003 | Cowan et al. | 358/1.9 |
| 2004/0042807 A1 * | 3/2004 | Nakayama | 399/49 |
| 2005/0039044 A1 * | 2/2005 | Gassho et al. | 713/201 |
| 2005/0100356 A1 * | 5/2005 | Yang et al. | 399/49 |
| 2009/0316008 A1 * | 12/2009 | Levi | 348/207.99 |
| 2012/0070200 A1 | 3/2012 | Hyoki | |

FOREIGN PATENT DOCUMENTS

| | | | |
|---|---|---|---|
| JP | 2003-037717 | * | 1/2003 |
| JP | 2003-149903 A | | 5/2003 |
| JP | 2004-341100 A | | 12/2004 |
| JP | 2005-20238 A | | 1/2005 |
| JP | 2012-70023 A | | 4/2012 |

\* cited by examiner

*Primary Examiner* — Ming Hon  
*Assistant Examiner* — Ibrahim Siddo  
(74) *Attorney, Agent, or Firm* — Fitzpatrick, Cella, Harper & Scinto

(57) ABSTRACT

The color image forming apparatus includes a CPU configured to correct a result of detecting a toner patch by a density sensor based on a result of detecting a first white reference plate by the density sensor, and to control a density or chromaticity of a toner image based on a result of detecting the toner patch by the density sensor corrected by the CPU. The CPU is configured to further correct the result of detecting the first white reference plate by the density sensor based on a result of detecting, by the density sensor, a second white reference plate for correcting the first white reference plate. With this configuration, a correction of a sensor output is performed with high accuracy, and detection accuracy of the density or the chromaticity by the sensor is enhanced.

10 Claims, 9 Drawing Sheets

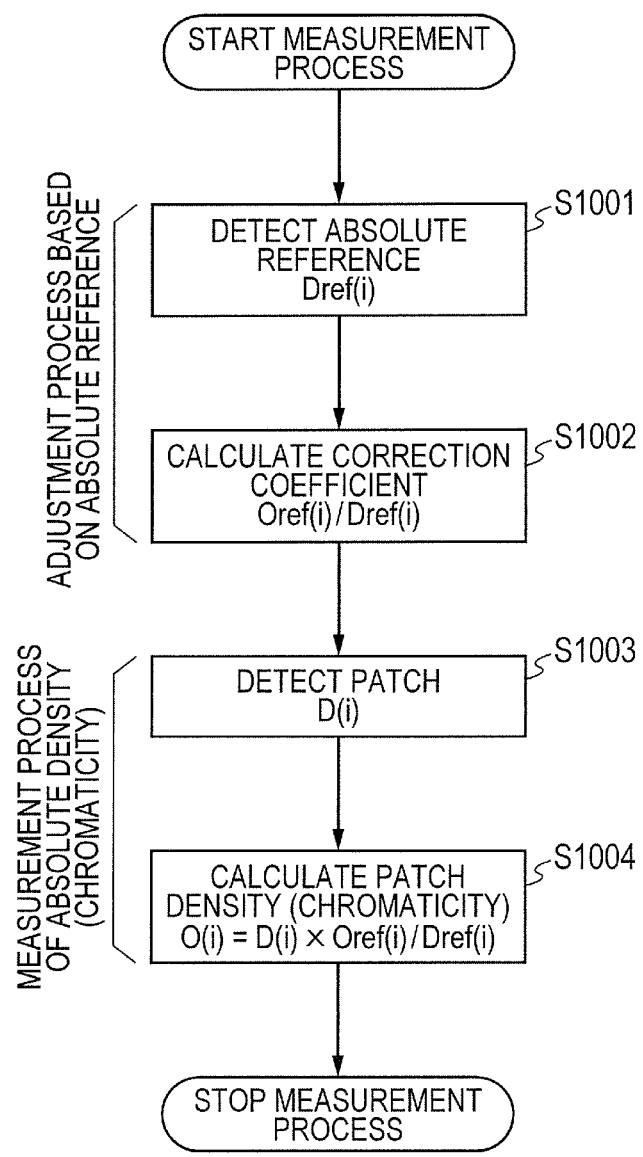

COLOR IMAGE FORMING APPARATUS

BACKGROUND OF THE INVENTION

1. Field of the Invention

The present invention relates to an image forming apparatus that controls an image processing unit by using information obtained by a color discrimination method of an electrophotographic or inkjet color image forming apparatus, such as a color printer and a color copy machine.

2. Description of the Related Art

In recent years, higher image quality of an output image has been demanded for an electrophotographic or inkjet color image forming apparatus such as a color printer and a color copy machine. Particularly, in the case of the electrophotographic color image forming apparatus, a constant gradation-density characteristic needs to be maintained all the time, because the color balance may be disrupted due to a variation in the density of an image caused by a change of the environment or a variation in each part of the apparatus due to a long time usage. To this end, a density sensor or a chromaticity sensor (hereinafter referred to as "color sensor") for detecting a density of a monochrome toner image or a color of a full color image on a transfer material after transferring and fixing toner images is installed in the color image forming apparatus. A color toner patch (hereinafter referred to as "patch") for controlling the density or the chromaticity is formed on the transfer material, and the density or the chromaticity detected by the color sensor is fed back to a process condition, such as an exposure amount, a process setting, or a look-up table (LUT). With this configuration, the density or the chromaticity of the final output image formed on the transfer material is controlled. For example, a gamma characteristic control is performed based on the measured density, or a correction of a color matching table or a color separation table is performed based on the measured chromaticity. The same goes for an inkjet printer.

In order to detect the density or the chromaticity of the patch with the color sensor, a white reference plate or the like for correcting a sensor output is required for the following reasons. The first reason is that a fluctuation of spectroscopic characteristics of a light emitting element and a light receiving element constituting the sensor needs to be corrected. The second reason is that, even when the same patch is used for the detection, different outputs may be produced due to a temporal change of a light emitting unit or a light receiving unit constituting the sensor or a change of the ambient temperature. The third reason is that, because a large number of transfer materials pass near the sensor at the time of normal printing, paper dust, toner, or ink may be scattered and deposited or adhered to a surface of the sensor, causing a degradation of the sensor output. In addition, in order to detect the absolute density or the absolute chromaticity of the patch by using the color sensor, there is required a white reference plate or the like for correcting the sensor output, which has a known absolute value of the density or the chromaticity.

For example, in Japanese Patent Application Laid-Open No. 2003-149903, a process of measuring the density or the chromaticity illustrated in FIG. 9 is executed by using a filter-type color sensor. Firstly, in Steps S1001 and S1002, a process of adjusting the color sensor is executed based on an absolute reference such as the white reference plate. Specifically, in Step S1001, an RGB output measured value Dref(i) (i=r, g, and b, the same applies hereinafter) of the absolute reference is detected by the color sensor. In Step S1002, a correction coefficient Oref(i)/Dref(i) is obtained from the RGB output measured value Dref(i) of the detected absolute reference and an RGB output theoretical value Oref(i) stored in advance. In Steps S1003 and S1004, a process of measuring the absolute density or the absolute chromaticity by the adjusted color sensor is executed. Specifically, in Step S1003, an RGB output measured value D(i) of a patch is detected by the color sensor. In Step S1004, the RGB output measured value D(i) of the detected patch is converted into an RGB output value O(i) corrected by using the absolute reference. The RGB output value O(i) is obtained by uniformly multiplying the RGB output measured value D(i) of the detected patch by the correction coefficient Oref(i)/Dref(i) as represented by Equation (1).

$$O(i)=D(i)\times Oref(i)/Dref(i)(i=r, g, \text{ and } b) \quad \text{Equation (1)}$$

Similarly, in a measurement of the density and the chromaticity by a spectrophotometric color sensor, a process of adjusting the color sensor by using the absolute reference and a process of measuring spectroscopic reflectivity by using the adjusted color sensor are executed. It is assumed that a spectroscopic output measured value of the absolute reference is represented by Dref(m), a spectroscopic output theoretical value is represented by Oref(m), a spectroscopic output measured value of a patch is represented by D(m), and a spectroscopic output value of the patch corrected by using the absolute reference is represented by O(m), provided that, m represents a wavelength in the visible light wavelength band. For example, m indicates an arbitrary wavelength in a wavelength range from 380 nm to 730 nm. As represented by Equation (2), the obtained spectroscopic output measured value D(m) of the patch is converted into the spectroscopic output value O(m) corrected by using the absolute reference. The spectroscopic output value O(m) is obtained by uniformly multiplying the obtained spectroscopic output measured value D(m) of the patch by a correction coefficient Oref(m)/Dref(m).

$$O(m)=D(m)\times Oref(m)/Dref(m)(m=380, 390, \ldots, 730) \quad \text{Equation (2)}$$

In the following, the reference plate, which is the absolute reference, is described as white. However, the reference plate is not limited to white, but may be any color so long as the absolute value of the density or the chromaticity is known.

However, the white reference plate that is generally and commonly used as the absolute reference for correcting the output of the color sensor may be discolored compared to the initial white reference plate due to yellowing generated after a long time irradiation with light from the color sensor, for example. Further, in the same manner as the color sensor, the white reference plate may become unusable as the absolute reference due to the scattering of paper dust, toner, or ink. If the correction of the color sensor output is performed in a state in which the white reference plate is stained and discolored, the color sensor ends up with outputting a value that is different from the actual density or chromaticity of the patch. If a control of the density or chromaticity is performed by using the result, the color balance cannot be obtained, and as a result, a desired gradation-density characteristic cannot be obtained. Not only that, the gradation-density characteristic is likely to disrupt the color balance.

SUMMARY OF THE INVENTION

According to the above-mentioned circumstances, the present invention has been made in view of a purpose to enhance accuracy of detecting a density or chromaticity through use of a sensor by performing correction of a sensor output with high accuracy.

A purpose of the invention is to provide a color image forming apparatus, including an image forming unit that forms a toner image on a transfer material, a fixing device that fixes the toner image formed on the transfer material by the image forming unit, a detector detects the toner image fixed onto the transfer material by the fixing device, a first reference for correcting a detection result of the toner image detected by the detector, and a correction unit that corrects, based on a detection result of the first reference detected by the detector, the detection result of the toner image by the detector to obtain a corrected detection result of the toner image, wherein the color image forming apparatus is configured to control a density or a chromaticity of the toner image formed by the image forming unit based on the corrected detection result of the toner image corrected by the correction unit, and wherein based on a detection result of a second reference for correcting the first reference, detected by the detector, the correction unit corrects the detection result of the first reference detected by the detector.

Further features of the present invention will become apparent from the following description of exemplary embodiments with reference to the attached drawings.

BRIEF DESCRIPTION OF THE DRAWINGS

FIG. 9 is a flowchart of a process of measuring a density and chromaticity according to a conventional example.

DESCRIPTION OF THE EMBODIMENTS

Exemplary embodiments of the present invention are described in detail below.

First Embodiment

A color image forming apparatus according to a first embodiment of the present invention includes an image processing unit, an image forming unit, and a detector provided in the image forming unit, for detecting a density of a predetermined color.

(Configuration of Density Sensor)

Figure 1A:
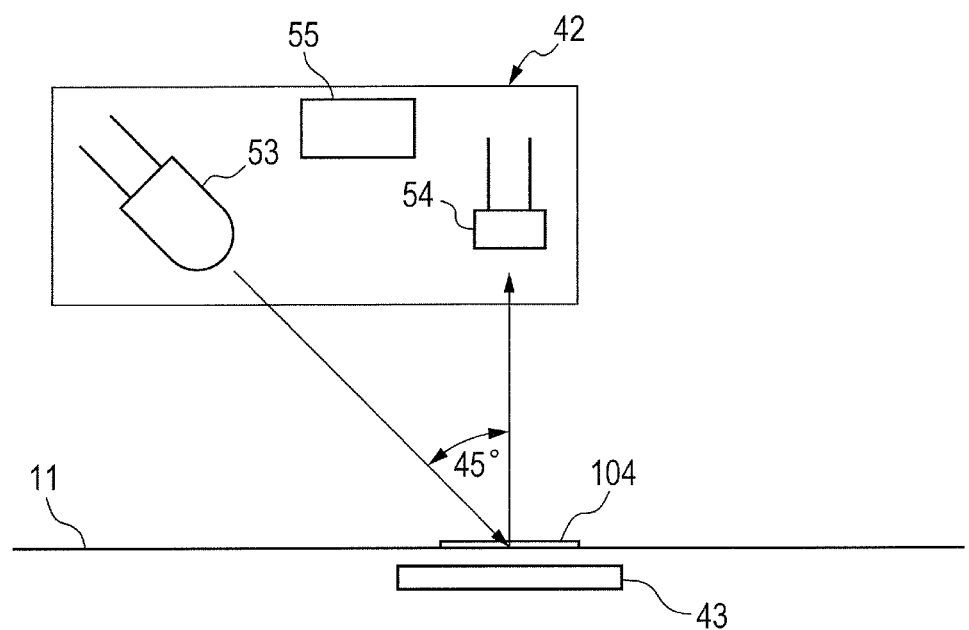
FIGS. 1A and 1B are diagrams illustrating a configuration of a filter-type density sensor according to a first embodiment of the present invention.

As the detector for detecting the density, a configuration of a filter-type density sensor 42 is illustrated in FIG. 1A. The density sensor 42 includes a white light emitting diode (LED) 53 as a white light emitting unit and a charge accumulation sensor 54 including an RGB on-chip filter as a light receiving unit including on-chip filters of three different colors or more. A predetermined density can be detected by detecting reflected light from an object to be measured via the RGB three types of filters. The density sensor 42 further includes a memory 55 in which an area for storing the absolute density value of a white reference plate and detection values of the white reference plate and a patch pattern (hereinafter also referred to as "toner patch") for controlling the gradation-density characteristic is ensured.

Figure 1B:
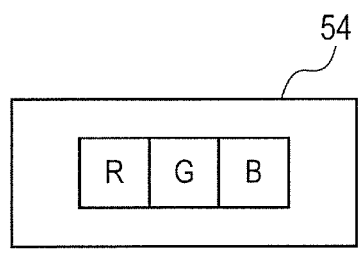

Light from the white LED 53 is controlled to enter a surface of a transfer material 11, on which a patch pattern 104 for controlling the gradation-density characteristic is formed, at an angle of, for example, 45 degrees, and an optical intensity of a diffusely reflected light in a direction of 0 degrees is detected by the charge accumulation sensor 54 including an RGB on-chip filter. A light receiving unit of the charge accumulation sensor 54 including an RGB on-chip filter includes separate RGB pixels as illustrated in FIG. 1B. Alternatively, the light receiving unit of the charge accumulation sensor 54 including an RGB on-chip filter may include multiple sets of RGB three pixels arranged in an array. Further, a first white reference plate 43 (first reference) is arranged to be opposed to the density sensor 42, sandwiching a conveying path of the transfer material 11 therebetween.

The charge accumulation sensor 54 including an RGB on-chip filter may be a photodiode. Although it is described that the incident angle is 45 degrees and the reflection angle is 0 degrees in the first embodiment, the incident angle may be set to a shallow angle of, for example, 60 degrees. Further, the incident angle may be 0 degrees and the reflection angle may be 45 degrees. In addition, the LEDs that respectively emit light of RGB three colors as the light emitting unit for emitting light of the three different colors or more and the sensor as the light receiving unit may be configured without a filter.

(Block Diagram of Image Forming Apparatus)

Figure 2A:
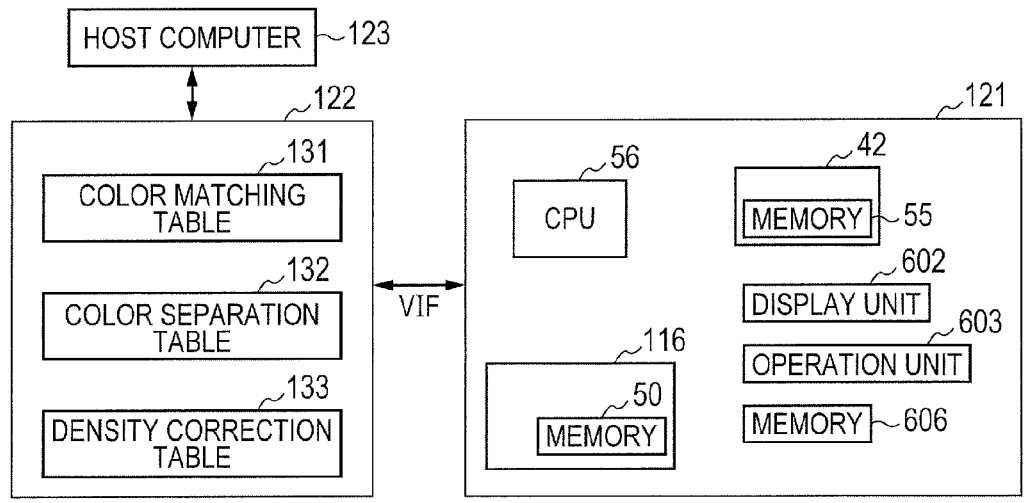
FIGS. 2A and 2B are diagrams illustrating an image forming apparatus according to first to sixth embodiments of the present invention.

FIG. 2A is a schematic diagram illustrating the image forming apparatus. An image processing unit 122 and an image forming unit 121 of the image forming apparatus are connected to each other through a video interface (VIF in FIG. 2A), and the image processing unit 122 is connected to a host computer 123 of an external terminal or a network (not shown). A color matching table 131 used for a color conversion, a color separation table 132, and a density correction table 133 are stored in a storing unit of the image processing unit 122, such as a memory. The image forming unit 121 includes the density sensor 42, a cartridge 116, and a central processing unit (CPU) 56 that performs an image forming process and a processing of a measurement result from the density sensor 42. Although the cartridge 116 includes a cartridge 116Y, a cartridge 116M, a cartridge 116C, and a cartridge 116K corresponding to yellow, magenta, cyan, and black, respectively, it is hereinafter simply referred to as "cartridge 116".

The image forming unit 121 further includes a display unit 602, an operation unit 603, and a memory 606. The density sensor 42 includes the memory 55, and the cartridge 116 includes a memory 50.

(Image Processing Unit)

Figure 3:
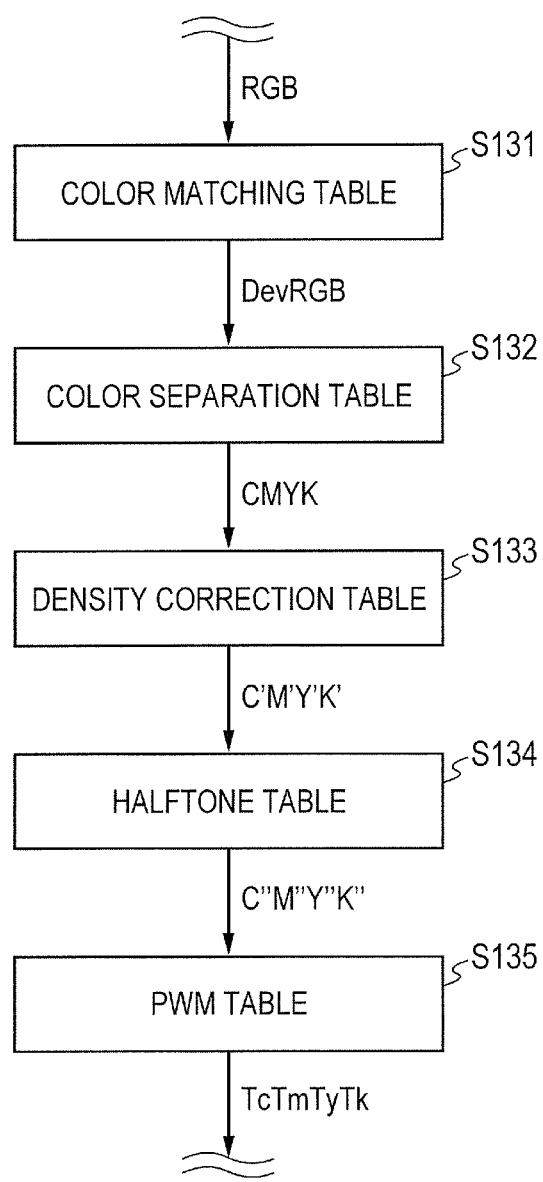
FIG. 3 is a flowchart of a process executed in an image processing unit according to the first embodiment.

The process of the image processing unit 122 and the correction using the density sensor 42 are described with reference to a flowchart of FIG. 3 that illustrates an example of a process in the image processing unit 122 illustrated in FIG. 2A. In Step S131, the image processing unit 122 converts an RGB signal output from the host computer 123 into a device RGB signal (hereinafter referred to as "DevRGB signal") based on the color matching table 131 that is prepared in advance. More specifically, the image processing unit 122 converts the RGB signal that represents a color of an image supplied from the host computer 123 or the like into the DevRGB signal that is fitted for a color reproduction area of the color image forming apparatus. In Step S132, the image processing unit 122 converts the DevRGB signal into a CMYK signal that represents a color of a toner material of the color image forming apparatus based on the color separation table 132.

In Step S133, the image processing unit 122 converts the CMYK signal into a C'M'Y'K' signal, to which a correction of the gradation-density characteristic is applied, based on the density correction table 133 for correcting the gradation-density characteristic unique to each color image forming apparatus. In Step S134, the image processing unit 122 performs a halftone process based on a halftone table to convert the C'M'Y'K' signal into a C"M"Y"K" signal. In Step S135, the image processing unit 122 converts the C"M"Y"K" signal into exposure times Tc, Tm, Ty, and Tk of scanner units 3 illustrated in FIG. 2B, which are described later, corresponding to the C"M"Y"K" signal based on a pulse width modulation (PWM) table. The image processing unit 122 outputs information of the exposure times Tc, Tm, Ty, and Tk to the image forming unit 121 via the video interface VIF. The halftone table and the PWM table are stored in a storing unit such as the memory of the image processing unit 122 (not shown in FIG. 2A).

(Configuration of Color Image Forming Apparatus)

Figure 2B:
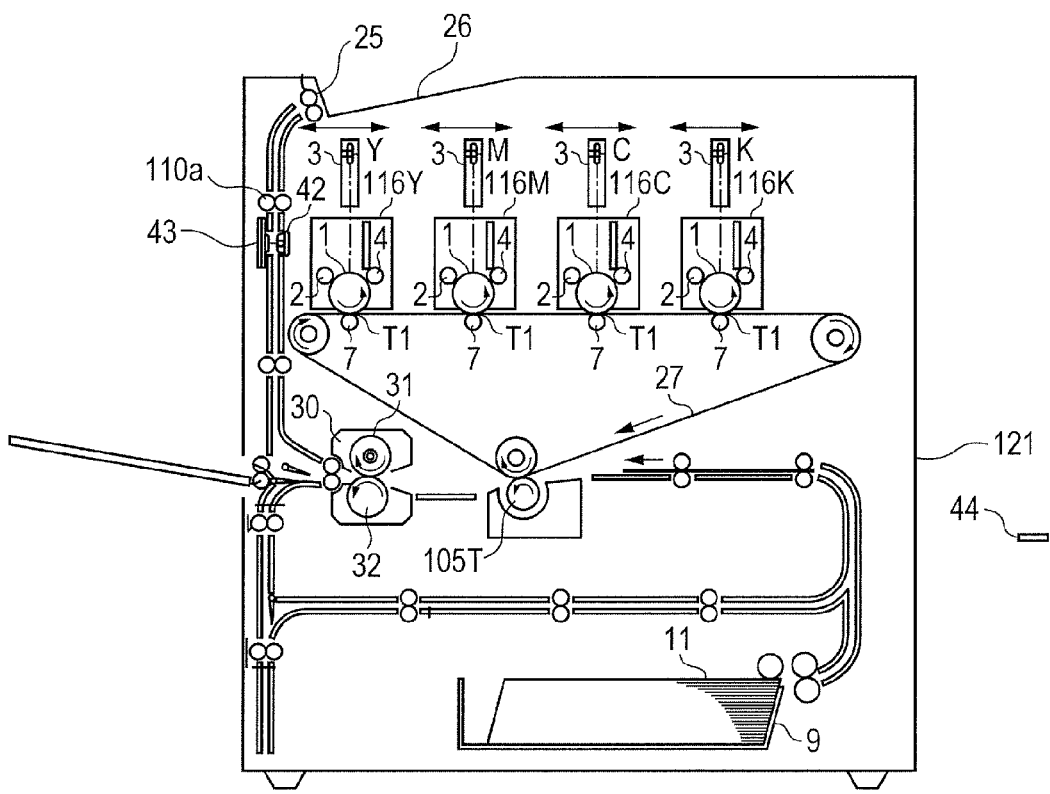

The color image forming apparatus including the density sensor 42 is described with reference to FIG. 2B. The color image forming apparatus according to the first embodiment is a four-color image forming apparatus including, for example, yellow (Y), magenta (M), cyan (C), and black (K), and the suffixes Y, M, C, and K of the reference symbols are omitted hereinafter unless they are necessary. FIG. 2B is a cross-sectional view of the image forming apparatus, for illustrating a configuration of the image forming unit 121. The color image forming apparatus including the image forming unit 121 is a tandem-type color image forming apparatus employing an intermediate transfer belt 27.

The operation of the image forming unit 121 is described. The image forming unit 121 includes a photosensitive drum 1, an injection charger 4, and the cartridge 116 for each of stations arranged as many as the number of developer colors (for example, four colors). The image forming unit 121 further includes a developing unit including a sleeve 2, a primary transfer roller 7, the intermediate transfer belt 27, a secondary transfer roller 105T, and a fixing unit 30.

The photosensitive drum 1 includes an aluminum cylinder and an organic photoconductive layer applied around the aluminum cylinder, and is rotated through transmission of a driving force from a driving motor (not shown). The driving motor rotates the photosensitive drum 1 in a counterclockwise direction in response to an image forming operation. Four injection chargers 4 are provided as a primary charging unit, for uniformly charging the photosensitive drums 1 of yellow (Y), magenta (M), cyan (C), and black (K) of the respective stations. The scanner units 3 turn on the laser light based on the exposure times (for example, Ty, Tm, Tc, and Tk (see FIG. 3)) converted by the image processing unit 122, and irradiate the photosensitive drums 1 with exposure light. By selectively exposing the surface of the photosensitive drum 1, an electrostatic latent image is formed on the photosensitive drum 1. In order to develop the electrostatic latent image formed on the photosensitive drum 1 into a visible image, four developing units as developing devices for developing yellow (Y), magenta (M), cyan (C), and black (K) each including the sleeve 2 are respectively provided for the stations. The developing unit including the sleeve 2 forms a monochrome toner image by developing the electrostatic latent image formed on the photosensitive drum 1. The monochrome toner image formed on the photosensitive drum 1 is then transferred onto the intermediate transfer belt 27 by the primary transfer roller 7 in a transfer portion T1.

The intermediate transfer belt 27 is brought into contact with the photosensitive drum 1, and is rotated in a clockwise direction along with the rotation of the photosensitive drum 1 at the time of forming a color image. The monochrome toner image is then transferred onto the intermediate transfer belt 27 by the primary transfer roller 7 in the transfer portion T1, and the monochrome images of the respective colors are sequentially superimposed on the intermediate transfer belt 27 to form a multicolor toner image. Thereafter, the secondary transfer roller 105T is brought into contact with the intermediate transfer belt 27 to form a nip for conveying the transfer material 11. In this manner, the multicolor toner image formed on the intermediate transfer belt 27 in a superimposed manner is transferred onto the transfer material 11 by the secondary transfer roller 105T.

The transfer material 11 is conveyed on the conveying path from a feeding unit 9 at a timing at which the multicolor toner image formed on the intermediate transfer belt 27 is transferred to a desired position on the transfer material 11 by the secondary transfer roller 105T. In the first embodiment, the unit that performs processes from forming the electrostatic latent image on the photosensitive drum 1 to transferring the toner image onto the transfer material 11 by the secondary transfer roller 105T is referred to as the image forming unit. That is, the unit that forms the toner image on the transfer material 11 is the image forming unit.

The fixing unit 30 (fixing device) melts and fixes the transferred multicolor toner image onto the transfer material 11 while conveying the transfer material 11. The fixing unit 30 includes a fixing roller 31 that heats the transfer material 11 and a pressure roller 32 that brings the transfer material 11 into press-contact with the fixing roller 31. The transfer material 11 onto which the multicolor toner image is transferred is conveyed by the fixing roller 31 and the pressure roller 32, and is applied with heat and pressure so that the toner is fixed onto the surface of the transfer material 11. The transfer material 11 onto which the toner image is fixed is then delivered to a delivery tray 26 by a delivery roller 25. In this manner, the image forming operation is completed. The patch formed on the transfer material 11 for adjusting the density or the like is formed by the above-mentioned image forming process. The toner patch formed for adjusting the density or the like is supposed to be formed by using, for example, a known image pattern, and a description of the toner patch is omitted.

The density sensor 42 that detects the density of the predetermined image pattern is arranged facing an image forming surface of the transfer material 11 on a downstream side of the fixing unit 30 in the transfer material conveying path of the color image forming apparatus illustrated in FIG. 2B. The first white reference plate 43 is arranged to be opposed to the density sensor 42, sandwiching the conveying path of the transfer material 11 therebetween. The density sensor 42 detects the first white reference plate 43 and the toner patch formed on the transfer material 11 after being fixed, and outputs the RGB output value to the CPU 56. After the detection using the density sensor 42, the CPU 56 converts the RGB output value output from the density sensor 42 into the absolute density, outputs the absolute density to the image processing unit 122 via the video interface VIF, and causes the absolute value to be fed back to the density correction table 133 of the image processing unit 122. A conveying roller 110a will be described later.

(Process of Measuring Absolute Density According to First Embodiment)

As illustrated in FIG. 2B, a second white reference plate 44 (second reference) for adjusting the absolute density value of the first white reference plate 43 is separately provided in a measurement system according to the first embodiment, which is described later. A process of measuring the absolute density by the measurement system unique to the first embodiment is described with reference to FIG. 4. In steps where "density (chromaticity)" is described in FIG. 4, the "density" is used in the first embodiment, and the "chromaticity" is used in a second embodiment of the present invention that is described later. The measurement process includes three processes including a first adjustment process based on a first absolute reference, a process of measuring the absolute density, and a second adjustment process of adjusting (correcting) the first absolute reference based on a second absolute reference. The first adjustment process is always performed before performing the measurement of the absolute density. The first absolute reference indicates the first white reference plate 43, and the second absolute reference indicates the second white reference plate 44 (the same goes for FIG. 4).

The first white reference plate 43 is a member, for example, made of plastic, and a relatively inexpensive white material can be used therefor so long as the color is stable at the time of using the image forming apparatus. Further, the first white reference plate 43 has a broad utility to be installed in any type of image forming apparatus, and is easy to maintain. The first white reference plate 43 described above may have yellowing over time due to, for example, the irradiation with the light from the density sensor 42 so that the first white reference plate 43 may be discolored compared to the first white reference plate 43 at the initial usage.

On the other hand, the second white reference plate 44 is a member, for example, made of a relatively expensive material such as ceramic, which is maintained by, for example, a service engineer. The second white reference plate 44 is a member in which the chromaticity is known in advance, and has not only a color stability but also a characteristic that does not have yellowing due to, for example, the irradiation with the light from the density sensor 42 even when it is used for a long time. In this manner, the second white reference plate 44 is expensive and needs to be maintained strictly, and hence it is not considered to install the second white reference plate 44 in the image forming apparatus as a substitute for the versatile first white reference plate 43.

(First Adjustment Process)

For example, at the time of factory shipment, an initial value Oref1($i$) of the RGB absolute value of the first white reference plate 43 arranged facing the density sensor 42 is stored in the memory 55 of the density sensor 42 arranged in the color image forming apparatus. The RGB absolute value is a value that can be converted into the absolute density, in other words, the RGB absolute value is a value having a clear correlation with the absolute density. In the first embodiment, the initial value Oref1($i$) of the RGB absolute value of the first white reference plate 43 is a reflectivity obtained by a reflection density meter or the like at the time of factory shipment, where i=r, g, and b. An optical density OD and a reflectivity R (0 to 1.0) have the following relationships.

$$OD = \text{Log}_{10}(1/R) \quad \text{Equation (3)}$$

$$R = 10^{-OD} \quad \text{Equation (4)}$$

By Equation (4), the optical density OD measured by the reflection density meter or the like can be converted into the reflectivity R. Further, the reflectivity R can be converted into the optical density OD by Equation (3).

In the first embodiment, a case where the density of each color of C, M, Y, and K on the transfer material 11 is measured by the density sensor 42 and the measured density is fed back to the density correction table 133 for correcting the gradation-density characteristic in the image processing unit 122 is described as an example. Firstly, the first adjustment process using the first white reference plate 43 is described as a preliminary preparation for measuring the toner patch by the density sensor 42. In Step S100, the CPU 56 determines whether to execute the second adjustment process. When it is determined to execute the first adjustment process without executing the second adjustment process, the CPU 56 advances to a process of Step S101, and when it is determined to execute the second adjustment process, the CPU 56 advances to a process of Step S105. The CPU 56 determines whether to execute the second adjustment process based on, for example, whether or not the number of printed sheets reached a predetermined number.

In Step S101, the CPU 56 detects, by the density sensor 42, the first white reference plate 43 arranged facing the density sensor 42 to obtain an RGB measured value Dref1($i$). When the first adjustment process is executed after executing the second adjustment process that is described later, the same process as Step S101 is performed in Step S108 that is described later, and in this case, the process control can advance to Step S102 without performing the process of Step S101. In Step S102, the CPU calculates a correction coefficient from the RGB measured value Dref1($i$) of the detected first white reference plate 43 and the initial value (reflectivity) Oref1($i$) of the RGB absolute value of the first white reference plate 43 stored in advance in the memory 55. Specifically, the CPU 56 calculates the correction coefficient Oref1($i$)/Dref1($i$). The CPU 56 then stores the calculated correction coefficient Oref1($i$)/Dref1($i$) in the memory 55.

(Measurement of Absolute Density)

A measurement of the reflectivity of the toner patch, which is the process of measuring the absolute density after the first adjustment process, is described. In Step S103, the CPU 56 starts a transfer material conveying operation, and at a timing when the toner patch formed on the transfer material 11 passes while facing the density sensor 42, detects the toner patch (referred to simply as "patch" in FIG. 4) to obtain an RGB measured value D(i). The CPU 56 can detect that the toner patch has reached the density sensor 42 based on, for example, a detection of a predetermined image located at the leading end of the toner patch in the conveying direction. Alternatively, for example, the CPU 56 may manage time for the toner patch to reach the density sensor 42 by using a timer (not shown) or the like from the conveying speed of the transfer material 11 and the position of the density sensor 42 on the conveying path.

In Step S104, the CPU 56 calculates the reflectivity O(i) of the toner patch from the obtained RGB measured value D(i) of the toner patch and the correction coefficient Oref1($i$)/Dref1($i$) calculated in Step 102 and stored in the memory 55, as represented by Equation (5) described below. Specifically, the CPU 56 (correction unit) converts the obtained RGB measured value D(i) of the toner patch into the reflectivity O(i) of the toner patch that is corrected by using the first white reference plate 43. The reflectivity O(i) of the toner patch is obtained by multiplying the RGB measured value D(i) of the toner patch by the correction coefficient Oref1(i)/Dref1(i).

$$O(i)=D(i) \times Oref1(i)/Dref1(i) (i=r,g, \text{ and } b) \quad \text{Equation (5)}$$

The CPU 56 converts the converted reflectivity O(i) of the toner patch into an absolute density value OD(i) by Equation (3) (the reflectivity is represented by R), and stores the absolute density value OD(i) in the memory 55. In the same manner, the CPU 56 detects multiple toner patches, calculates the reflectivities O(i) of the multiple patches, respectively, stores the calculated reflectivities O(i) in the memory 55, and transfers the absolute density values of the multiple toner patches at once or in a divided manner to the memory 606 of the color image forming apparatus (see FIG. 2A). With the configuration described above, the absolute density value can be calculated by the density sensor 42 installed in the image forming apparatus.

(About Gradation Control)

Figure 4:
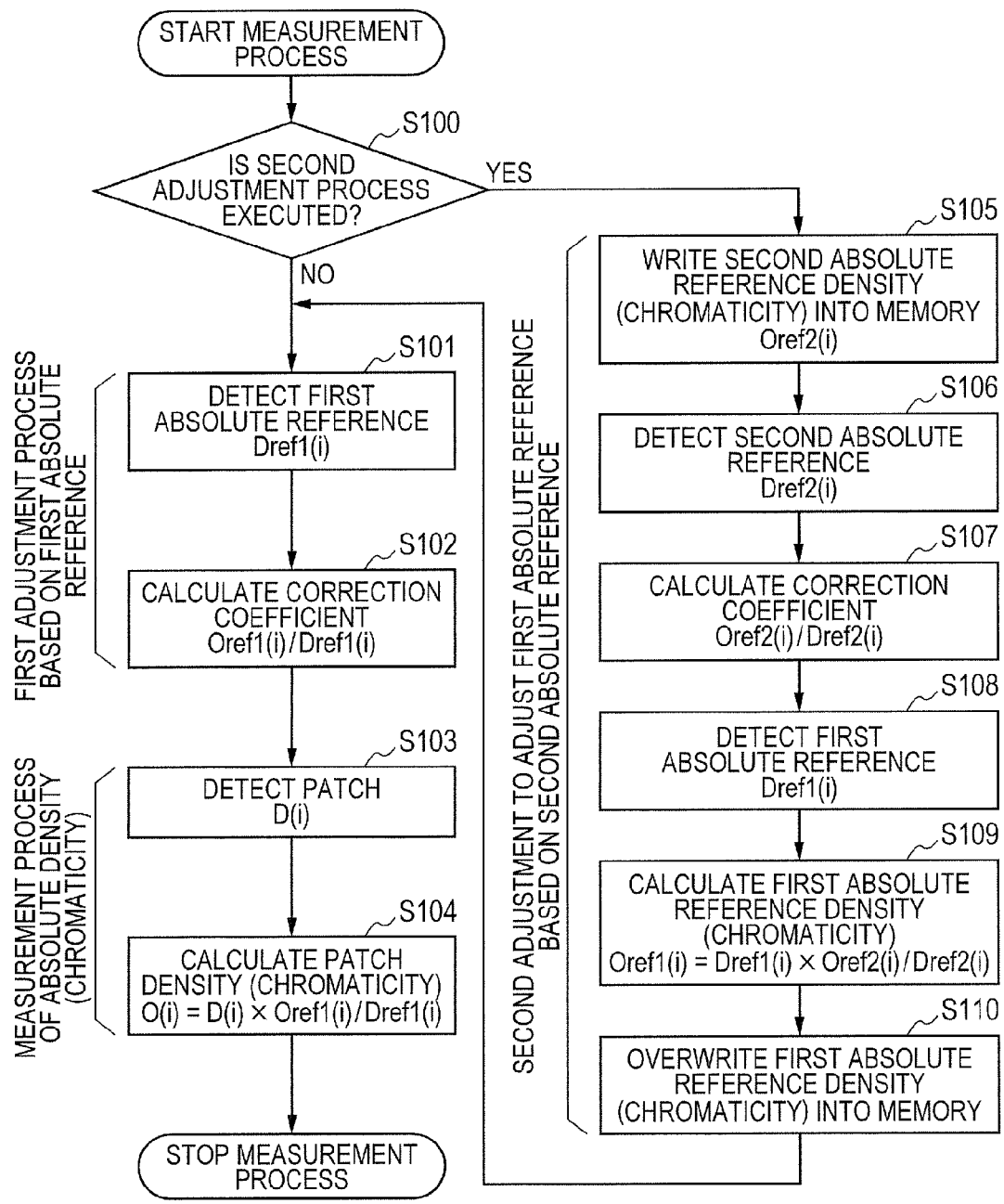
FIG. 4 is a flowchart of a process of measuring the absolute density in the first embodiment and the absolute chromaticity in the second embodiment.

A gradation control is described in detail with reference to FIG. 5, in which the result of measurement by the process of measuring the absolute density illustrated in FIG. 4 is fed back to the density correction table 133. The toner patch to be detected by the density sensor 42 is a toner patch for correcting the density, and hence the CPU 56 forms color toner patches in monochrome with a variation in the density on the transfer material 11. Although only a gradation correction of cyan color is described here, the same method is applied for gradation correction of magenta, yellow, and black.

Figure 5:
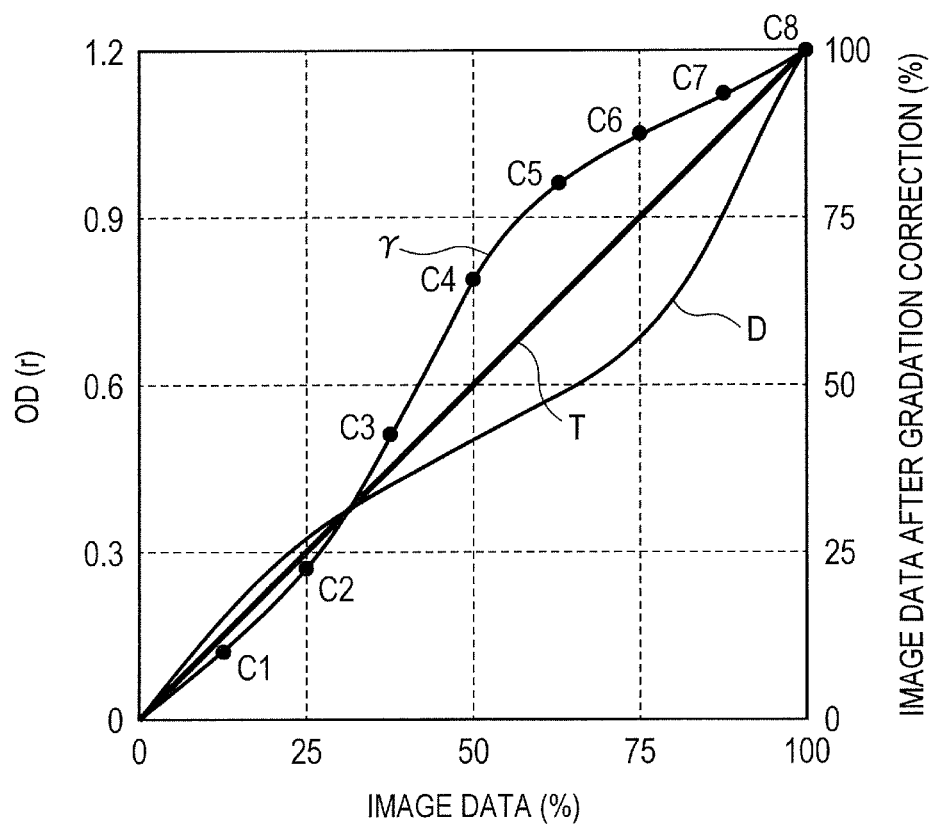
FIG. 5 is a graph showing a gradation control according to the first embodiment.

The horizontal axis of the graph shown in FIG. 5 represents image data (%), and the vertical axis represents density detection value OD(r) of the density sensor 42. The right-side vertical axis represents image data (%) after the gradation correction. In order to detect the density of cyan color, the density is obtained from a RED output of RGB by using a red filter having a complementary relationship with cyan. Black solid circles in FIG. 5 represent output density values of the density sensor 42 with respect to eight gradation toner patches of C1, C2, C3, C4, C5, C6, C7, and C8 formed in cyan on the transfer material 11. That is, the points C1 to C8 represented by the black solid circles show a curve obtained by plotting a value obtained by converting the reflectivity D(i) detected in Step S103 of FIG. 4 into the density OD by using Equation (3) (the reflectivity is represented by R) by the CPU 56. A straight line T represents a target gradation-density characteristic of the image density control. In the first embodiment, the target gradation-density characteristic T is determined so that the image data and the density have a proportional relationship. A curve γ represents the gradation-density characteristic in a state in which the gradation control is not executed. Regarding the density of the gradation for which the toner patch is not formed (between black solid circles), the CPU 56 calculates the values by, for example, performing a spline interpolation to pass through the origin and the points C1, C2, C3, C4, C5, C6, C7, and C8.

A curve D represents a gradation correction curve calculated by the above-mentioned control, which is calculated by obtaining symmetric points with respect to the target gradation-density characteristic T of the gradation characteristic γ before being corrected. The calculation of the gradation correction curve D is performed by the CPU 56 of the image forming unit 121, and the calculated gradation correction curve D is temporarily stored in the memory 606 of the image forming unit 121 as a density correction table of discrete values. The sent density correction table temporarily stored in the memory 606 of the image forming unit 121 is sent to the image processing unit 122 via the video interface VIF. The density correction table is then stored as the density correction table 133 of the image processing unit 122, and the operation of creating the density correction table for the gradation correction control by the absolute density detected by the density sensor 42 is completed.

(Second Adjustment Process)

The second adjustment process of adjusting the absolute output value of the first white reference plate 43 used in the first adjustment process by using the second white reference plate 44 illustrated in FIG. 2B is described. The second adjustment process is executed in Step S105 and subsequent steps when the CPU 56 determines to execute the second adjustment process in Step S100 of FIG. 4. The CPU 56 determines whether to execute the second adjustment process based on, for example, the number of transfer materials passed (page count), an operation time of the image forming apparatus, or information having a correlation with the operation time of the image forming apparatus, such as a pixel count of the image data. For example, a message prompting an execution of the second adjustment process is displayed on the display unit 602 illustrated in FIG. 2A when a predetermined number of pages are passed based on the page count accumulated in the image processing unit 122 of the image forming apparatus. In response to this, a service engineer or a user performs the second adjustment process. The second white reference plate 44 used in the second adjustment process is stored outside the image forming apparatus and maintained not to have a stain or a discoloration. However, the second white reference plate 44 may be arranged, for example, in the image forming apparatus, and in this case, the second white reference plate 44 is arranged at a position free from a stain due to the toner or the paper dust. In the first embodiment, the second white reference plate 44 is arranged outside the image forming apparatus as a separate member.

A reflectivity Oref2(i) is applied in advance to the second white reference plate 44, and in Step S105, the CPU 56 writes the reflectivity Oref2(i) into the memory 55 provided in the density sensor 42. For example, writing from the host computer 123 connected to the image forming apparatus or the operation unit 603 of the image forming unit 121, such as an operation panel, is performed by the manufacturer at the time of shipment from the manufacturer or by the user after shipment. When the second adjustment process is already executed so that the reflectivity Oref2(i) of the second white reference plate 44 is already stored in the memory 55, the process of Step S105 may be skipped. The density and the reflectivity can be converted into each other by Equations (3) and (4), and hence "writing of the density" is illustrated in Step S105.

(Second White Reference Plate 44)

Figure 6A:
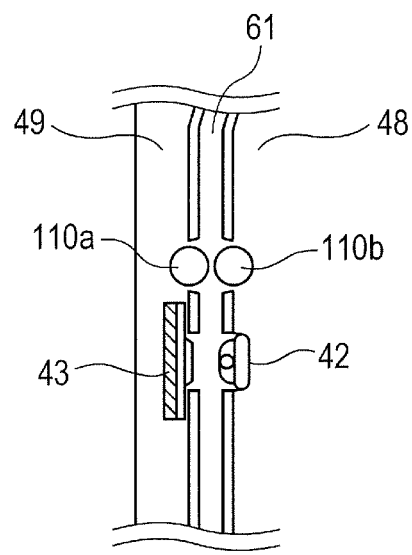
FIGS. 6A and 6B are diagrams illustrating a configuration of the image forming apparatus according to the first and fourth embodiments, in which a second white reference plate is brought into contact with a density sensor.

A configuration of the image forming apparatus for bringing the second white reference plate 44 into contact with the density sensor 42 is described with reference to FIGS. 6A and 6B. In the first embodiment, the image forming apparatus includes an opening and closing mechanism for exposing a reading unit of the density sensor 42 from inside the image forming apparatus main body, and the second white reference plate 44 is placed against the reading unit. FIG. 6A is an enlarged cross-sectional view of a conveying path for measuring the color by the density sensor 42, where a conveying roller 110b and the conveying roller 110a form a nip for the transfer material 11 and the conveying roller 110b is rotated. With this configuration, the color of the toner patch is measured while conveying the transfer material 11. A main body side 48 and a cover unit 49 of the opening and closing mechanism are arranged to sandwich a conveying path 61 therebetween.

Figure 6B:
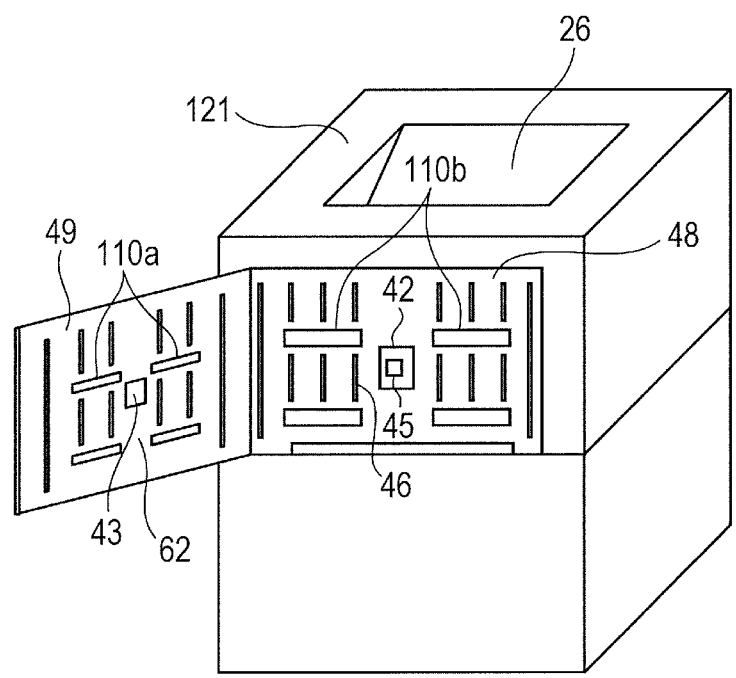

FIG. 6B is a perspective view of the image forming unit 121 in a state in which the cover unit 49 that is the opening and closing mechanism is opened. The conveying roller 110a and the first white reference plate 43 are installed on the main body exterior side, and the opening and closing mechanism of the cover unit 49 also serves as an opening and closing mechanism for jam fixing process. When the cover unit 49 is opened, the density sensor 42, the conveying roller 110b, and a conveying rib are exposed. An opening portion 45 of the density sensor 42 is exposed on the main body side 48 illustrated in FIG. 6B. By tightly bringing the second white reference plate 44 into contact with the opening portion 45 so that external light does not enter the density sensor 42, the second adjustment process is performed. The first white reference plate 43 is removable, and the second white reference plate 44 has the same shape as the first white reference plate 43. The first white reference plate 43 may be removed from the cover unit 49, and the second white reference plate 44 may be installed at the position from which the first white reference plate 43 is removed. In this case, the second white reference plate 44 is detected by the density sensor 42 in a state in which the cover unit 49 is closed.

As described above, with the configuration of brining the second white reference plate 44 into contact with the density sensor 42, the CPU 56 detects the second white reference plate 44 and obtains the RGB measured value Dref2($i$) in Step S106. In Step S107, the CPU 56 calculates a correction coefficient Oref2($i$)/Dref2($i$) from the RGB measured value Dref2($i$) of the detected second white reference plate 44 and the reflectivity Oref2($i$) stored in the memory 55, and stores the calculated correction coefficient Oref2($i$)/Dref2($i$) in the memory 55.

In Step S108, the CPU 56 detects the first white reference plate 43 and obtains the RGB measured value Dref1($i$). The detection of the first white reference plate 43 in Step S108 is performed in a state in which the cover unit 49 on which the first white reference plate 43 is installed is closed. In Step S109, the CPU 56 (correction unit) multiplies the RGB measured value Dref1($i$) of the first white reference plate 43 by the correction coefficient Oref2($i$)/Dref2($i$), as represented by Equation (6). The CPU 56 then converts the RGB measured value Dref1($i$) into the reflectivity Oref1($i$) of the first white reference plate 43 that is corrected by using the second white reference plate 44.

$$Oref1(i)=Dref1(i)\times Oref2(i)/Dref2(i)(i=r,g, \text{ and } b) \quad \text{Equation (6)}$$

In Step S110, the CPU 56 overwrites and stores the converted reflectivity Oref1($i$) of the first white reference plate 43 into the memory 55.

With the above-mentioned operations, the second adjustment process is completed, and the CPU 56 performs the first adjustment process (Steps S101 and S102) and the process of measuring the absolute density (Steps S103 and S104) following Step S101 and the subsequent steps. The CPU 56 performs Step S102 by using the RGB measured value Dref1($i$) of the first white reference plate 43 detected in Step S101 and the reflectivity Oref1($i$) of the first white reference plate 43 calculated and converted in Step S109. That is, the CPU 56 performs the first adjustment process (Steps S101 and S102) and the process of measuring the absolute density (Steps S103 and S104) by using data of the first white reference plate 43 that is corrected by using the second white reference plate 44.

The measurement of the density value by the density sensor 42 and the feedback of the measured density value to the density correction table 133 are described as an example in the first embodiment. In addition, the absolute chromaticity can be detected by applying a mathematical process such as a linear conversion or a conversion by an LUT on the RGB output detected by the density sensor 42. The result of detecting the absolute chromaticity may be fed back to the color matching table 131, the color separation table 132, or the like.

The white reference plate that is used in the image forming apparatus as the absolute reference for correcting the density sensor output may have yellowing over time due to, for example, the irradiation with light from the density sensor. In addition, in the same manner as the density sensor, the paper dust, the toner, or the ink may be scattered to the white reference plate so that its chromaticity is changed. However, as described above, according to the first embodiment, the second white reference plate having the known spectroscopic reflectivity and the first white reference plate that is installed inside the printer and used as the reference when detecting the toner patch are configured to be separate members from each other. With this configuration, even when the first white reference plate is stained or discolored over time due to a paper passing operation of the printer, the accuracy in measuring the color by the density sensor can be maintained by correcting the absolute chromaticity of the first white reference plate based on the second white reference plate. Therefore, even when there is yellowing on the first white reference plate, for example, the first white reference plate can be continuously used without being replaced. Although the configuration of bringing the white reference into contact with the density sensor is described in the first embodiment, the second white reference may be configured as a sheet that can be conveyed in the image forming apparatus so that the second white reference is read by the density sensor in a conveying unit. This method does not require a mechanical configuration for exposing the reading unit of the density sensor, simplifying the configuration of the image forming apparatus main body.

According to the first embodiment, the accuracy in detecting the density or the chromaticity by the sensor can be enhanced by performing the correction of the sensor output with high accuracy.

Second Embodiment

As a second embodiment of the present invention, a case where a spectrum color sensor is used as the detector for detecting a color is described. In the same manner as the first embodiment, the measurement process by the spectroscopic color measurement system includes three processes including a first adjustment process based on a first absolute reference, a process of measuring the absolute chromaticity, and a second adjustment process of adjusting the first absolute reference based on a second absolute reference. The process of the flowchart of FIG. 4 described in the first embodiment can also be applied to the second embodiment, in which the "density" in Step S104 and the like is replaced with the "chromaticity". Further, the notation of "(i)" in the flowchart of FIG. 4 is replaced with "(m)".

(Configuration of Color Sensor)

Figure 7A:
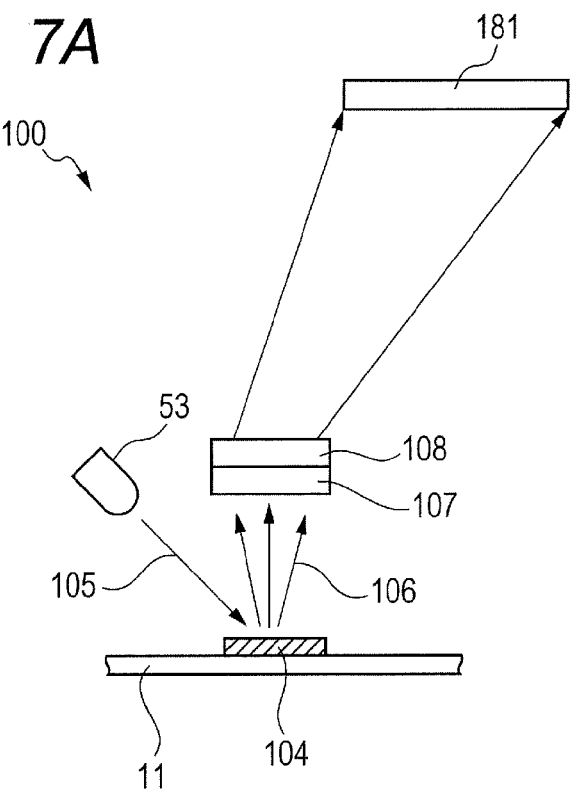
FIG. 7A is a diagram illustrating a configuration of a spectrum color sensor according to the second embodiment.

A configuration of the spectrum color sensor is described with reference to FIG. 7A. A spectrum color sensor 100 includes a line sensor 181 for detecting diffracted and dispersed light. A light source 53 includes a white LED, a halogen lamp, RGB three-color LEDs, or the like. The light source 53 has an emission wavelength distribution across the entire visible light. The color sensor 100 further includes a memory (not shown, corresponding to the memory 55 of the density sensor 42 illustrated in FIGS. 1A and 1B and the like) in which an area for temporarily storing a spectroscopic reflectivity of a white reference and detection values of the white reference and a toner patch is ensured.

Light 105 from the light source 53 enters a surface of the toner patch 104 surface formed on the transfer material 11 at an incident angle of about 45 degrees, diffusely reflected by the toner surface, and dispersed in the upward direction. Diffusely reflected light 106 is collimated by a lens 107, and then enters a diffraction grating 108 at an incident angle of 0 degrees so that the diffusely reflected light 106 is diffracted. The diffracted light enters the line sensor 181. Light beams having different wavelength ranges respectively enter pixels of the line sensor 181, and a spectroscopic output of an object to be measured is obtained by using an output result of each pixel.

The density sensor 42 illustrated in FIGS. 1A and 1B is used in the first embodiment. On the other hand, in the second embodiment, the spectrum color sensor 100 is used as the color sensor 42 in the image forming apparatus illustrated in FIG. 2B, and a measurement process of the chromaticity measurement system unique to the second embodiment is described with reference to FIG. 4. At the time of factory shipment, an initial value Oref1($m$) of the spectroscopic reflectivity of the first white reference plate 43 arranged facing the color sensor 42 is stored in a memory (hereinafter referred to as "memory 55") of the color sensor 42 arranged in the color image forming apparatus, where m represents the center wavelength of the diffusely reflected light that enters each pixel. In the second embodiment, the center wavelengths of the diffusely reflected light are, for example, wavelengths from 380 nm to 730 nm with intervals of 10 nm.

(First Adjustment Process and Process of Measuring Color of Toner Patch)

The first adjustment process is described below. In Step S101, the CPU 56 detects a spectroscopic output measured value Dref1($m$) of the first white reference plate 43 arranged facing the color sensor 42. Subsequently, in Step S102, the CPU 56 obtains a correction coefficient Oref1($m$)/Dref1($m$) from the spectroscopic output measured value Dref1($m$) of the detected first white reference plate and the initial value Oref1($m$) of the spectroscopic reflectivity stored in advance in the memory 55, and stores the obtained correction coefficient Oref1($m$)/Dref1($m$) in the memory 55.

The process of measuring a color of a toner patch after the first adjustment process is described. In Step S103, the CPU 56 starts a transfer material conveying operation, and at a timing when the toner patch formed on the transfer material 11 passes while facing the color sensor 42, detects a spectroscopic output measured value D(m) of the toner patch. The CPU 56 then converts the obtained spectroscopic output measured value D(m) of the toner patch into a spectroscopic reflectivity O(m) of the toner patch that is corrected by using the first white reference plate 43. The spectroscopic reflectivity O(m) is obtained by multiplying the obtained spectroscopic output measured value D(m) by the correction coefficient Oref1($m$)/Dref1($m$), as represented by Equation (7).

$$O(m)=D(m)\times Oref1(m)/Dref1(m)(m=380,390,\ldots,730) \quad \text{Equation (7)}$$

The converted spectroscopic reflectivity output value O(m) of the toner patch is temporarily stored in the memory 55, and transferred to the color image forming apparatus. The CPU 56 then converts the spectroscopic reflectivity into the absolute chromaticity such as CIE-XYZ and CIE-Lab.

(Correction of Color Separation Table)

A correction of the color separation table 132 is described. In a default setting, multiple pieces of CMYK format color toner patch data are stored in the image processing unit 122 as the color toner patch data. The default CMYK format color toner patch data is printed following the process described with reference to FIG. 3. A color of the color toner patch image formed on the transfer material is measured by the color sensor 42, and a chromaticity value (L*a*b*) is read. Specifically, the CPU converts the reflectivity O(m) detected by the color sensor 42 into the chromaticity value by a known conversion equation. The read chromaticity value is sent to a color conversion unit of the image processing unit 122, and by using a color management system (CMS) (now shown), the chromaticity value is converted into CMYK format data that depends on the image forming apparatus. The converted CMYK data and the CMYK data of the default color toner patch data are compared with each other, and pieces of correction data C', M', Y', and K' for correcting a difference between the converted CMYK data and the CMYK data of the default color toner patch data are generated.

The CPU 56 performs the above-mentioned operation on multiple toner patches, and regarding CMYK data which does not exist as the toner patch, creates the pieces of correction data C', M', Y', and K' by an interpolation. The CPU 56 stores the pieces of correction data in the image processing unit 122 as the corrected color separation table 132.

(Second Adjustment Process)

The second adjustment process is described. A spectroscopic reflectivity Oref2($m$) is applied in advance to the second white reference plate 44 used in the second adjustment process, and in Step S105, the CPU 56 writes the spectroscopic reflectivity Oref2($m$) of the second white reference plate 44 into the memory 55. Subsequently, in the same manner as the first embodiment, the second white reference plate 44 is placed on the color sensor 42, and in Step S106, a spectroscopic output measured value Dref2($m$) of the second white reference plate 44 is detected. In Step S107, the CPU 56 calculates a correction coefficient Oref2($m$)/Dref2($m$) from the spectroscopic output measured value Dref2($m$) of the detected second white reference plate 44 and the spectroscopic reflectivity Oref2($m$), and stores the calculated correction coefficient Oref2($m$)/Dref2($m$) in the memory 55. Subsequently, in Step S108, the CPU 56 detects the spectroscopic output measured value Dref1($m$) of the first white reference plate 43 by the color sensor 42.

In Step S109, the CPU 56 multiplies the spectroscopic output measured value Dref1($m$) of the first white reference plate 43 by the correction coefficient Oref2($m$)/Dref2($m$), as represented by Equation (8). The CPU then converts the spectroscopic output measured value Dref1($m$) into the spectroscopic reflectivity Oref1($m$) of the first white reference plate 43 that is corrected by using the second white reference plate 44.

$$Oref1(m)=Dref1(m)\times Oref2(m)/Dref2(m) \quad \text{Equation (8)}$$

In Step S110, the CPU 56 overwrites and stores the converted spectroscopic reflectivity Oref1($m$) of the first white reference plate 43 into the memory 55.

With these operations, the second adjustment process is completed, and the CPU 56 performs the first adjustment process (Steps S101 and S102) and the process of measuring the absolute chromaticity (Steps S103 and S104) following Step S101 and the subsequent steps. The CPU 56 performs Step S102 and the subsequent steps by using the spectroscopic output measured value Dref1($m$) of the first white reference plate 43 detected in Step S101 and the spectroscopic reflectivity Oref1($m$) of the first white reference plate 43 calculated and converted in Step S109. That is, the CPU 56 performs the first adjustment process (Steps S101 and S102) and the process of measuring the absolute chromaticity (Steps S103 and S104) by using data of the first white reference plate 43 that is corrected by using the second white reference plate 44.

As described above, according to the second embodiment, the color correction can be performed with the spectrum color sensor. The unique effect of the second embodiment is that, because the sensor is a spectroscopic sensor, it is not required to apply a mathematical process such as a linear conversion or a conversion by an LUT on the RGB output when obtaining the absolute chromaticity, and the accuracy in calculating the chromaticity is enhanced.

According to the second embodiment, the accuracy in detecting the density or the chromaticity by the sensor can be enhanced by performing the correction of the sensor output with high accuracy.

Third Embodiment

A third embodiment of the present invention relates to the second adjustment process with a configuration that the color sensor is removed from the image forming apparatus and is placed on the second white reference plate to read the second white reference plate. The configuration of the image forming apparatus is as illustrated in FIG. 2B referred to in the first embodiment, and the configuration of the color sensor is as illustrated in FIG. 7A referred to in the second embodiment.

(Removable Configuration of Color Sensor)

Figure 7B:
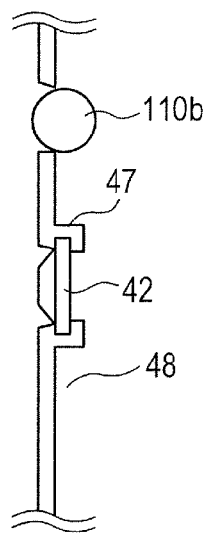
FIG. 7B is an enlarged cross-sectional view of a conveying path for measuring a color by the color sensor.

A removable configuration of the color sensor 42 according to the third embodiment is described in detail with reference to FIG. 7B. FIG. 7B is an enlarged cross-sectional view of a conveying path for measuring a color by the color sensor 42. The conveying path is exposed in a state in which a cover unit (now shown) is opened, and only the main body side 48 is illustrated in FIG. 7B. The color sensor 42 is fixed by a fixing mechanism provided to a conveyance guide 47, for fixing the color sensor 42.

Figure 7C:
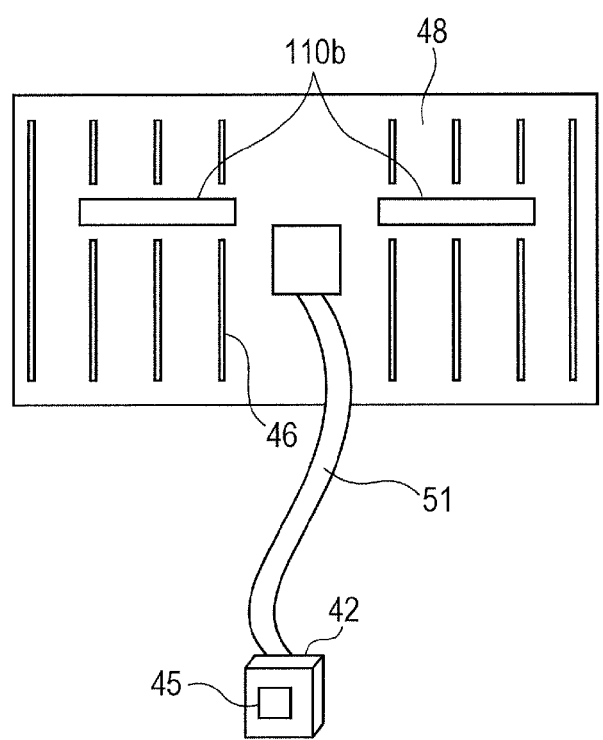
FIG. 7C is a diagram illustrating a configuration of the image forming apparatus according to the third embodiment in a state in which the color sensor is removed.

FIG. 7C is a diagram illustrating the color sensor 42 removed from the conveyance guide 47. The image forming apparatus and the color sensor 42 are connected with a flat cable 51, and the color sensor 42 has a degree of freedom on the position for measuring the color by the length of the flat cable 51. The process of Step S106 of the second adjustment process described in the first embodiment with reference to FIG. 4 is performed by bringing the color sensor 42 into press-contact with an arbitrary second white reference plate 44. The other processes are the same as those described in the second embodiment, and descriptions thereof are omitted. In addition, by applying the removable color sensor 42 according to the third embodiment to a removable density sensor, the same processes as those of the first embodiment can be executed.

The unique effect of the third embodiment is that the color sensor 42 is configured to be removed from the image forming apparatus and brought into press-contact with the second white reference plate 44 so that the degree of freedom in selecting the second white reference plate is broadened. It suffices that the shape of the white reference that serves as the second absolute reference is flat, and for example, an arbitrary white reference which is prepared by a user and of which the value is provided on the user side can be selected.

According to the third embodiment, the accuracy in detecting the density or the chromaticity by the sensor can be enhanced by performing the correction of the sensor output with high accuracy.

Fourth Embodiment

Removable First White Reference Plate

In a fourth embodiment of the present invention, a configuration that the first white reference is configured to be removable so that the white reference can be replaced is described.

The fourth embodiment is described with reference to FIG. 6B. FIG. 6B is a perspective view of the image forming apparatus in a state in which the cover unit 49 is opened. A fixing mechanism for fixing the first white reference plate 43 is provided on a conveyance guide 62 on the cover unit 49 side so that the first white reference plate 43 is fixed. By providing a mechanism for removing the first white reference plate 43, the white reference plate can be replaced. With this configuration, the first white reference plate can be replaced with new one. After the replacement, the second adjustment process for setting a value to the new first white reference plate is performed. The second adjustment process is described in the above-mentioned embodiments, and hence a description thereof is omitted.

The unique effect of the fourth embodiment is that, when the first white reference installed in the image forming apparatus is severely stained due to the conveyance of the transfer material or the toner, the density or the chromaticity can be measured with high accuracy by replacing the old first white reference with new one. With this configuration, even when the yellowing or the like is generated, the first white reference plate can be used for a long time by performing the correction by using the second white reference plate described in the first to third embodiments, and when the stain is noticeable, the old first white reference plate can be replaced with new one. The new first white reference plate can be used for measurement with high accuracy by setting the value of the chromaticity by using the second white reference plate.

According to the fourth embodiment, the accuracy in detecting the density or the chromaticity by the sensor can be enhanced by performing the correction of the sensor output with high accuracy.

Fifth Embodiment

In a fifth embodiment of the present invention, the second white reference plate is included in the expendables of the image forming apparatus. In the fifth embodiment, at the time of factory shipment of the expendables, the absolute density or the absolute chromaticity of the second white reference plate is stored in a storing unit such as a memory installed in the expendable, and at the time of performing the second adjustment process, the absolute density or the absolute chromaticity is read to perform the second adjustment process in an automatic manner. The expendables include, for example, a process-integrated cartridge (hereinafter simply referred to as "cartridge"), and in the fifth embodiment, a case where the second white reference plate 44 is included in the cartridge is described. As to the absolute density value or the absolute chromaticity value of the second white reference plate included in the cartridge, the absolute density or the absolute value of the chromaticity is measured and stored in the memory 50 of the cartridge 116 illustrated in FIG. 2A, which is the storing unit, before shipping the expendables.

At the time when a new cartridge is installed in the image forming apparatus, the absolute density value Oref2($i$) or the absolute chromaticity value Oref2($m$) of the second white reference stored in the memory 50 of the cartridge 116 is automatically transferred and stored into the memory 55. Specifically, the CPU 56 reads the absolute density value Oref2($i$) or the absolute chromaticity value Oref2($m$) from the memory 50 of the cartridge 116, and stores the absolute density value Oref2($i$) or the absolute chromaticity value Oref2($m$) in the memory 55. The image forming apparatus then displays a message prompting the second adjustment process on the operation panel that is the display unit 602 or a terminal of the host computer 123. The subsequent steps of the second adjustment process and the first adjustment process executed thereafter are performed in the same manner as the first embodiment.

Although it is described that the second white reference is included in the expendables in the fifth embodiment, when the second white reference is independently provided, the absolute output value of the second white reference needs to be stored in the image forming apparatus, which needs to be input from the operation unit 603 of the image forming apparatus. According to the fifth embodiment, the absolute value of the second white reference plate is stored in the storing unit of the expendable, and the absolute value is automatically read from the storing unit to perform the second adjustment process. Therefore, there is no need for a service engineer or a user to input the absolute value of the second white reference.

According to the fifth embodiment, the accuracy in detecting the density or the chromaticity by the sensor can be enhanced by performing the correction of the sensor output with high accuracy.

Sixth Embodiment

Detection of Stain of White Reference Plate and Detection of Sensor Abnormality

Figure 8:
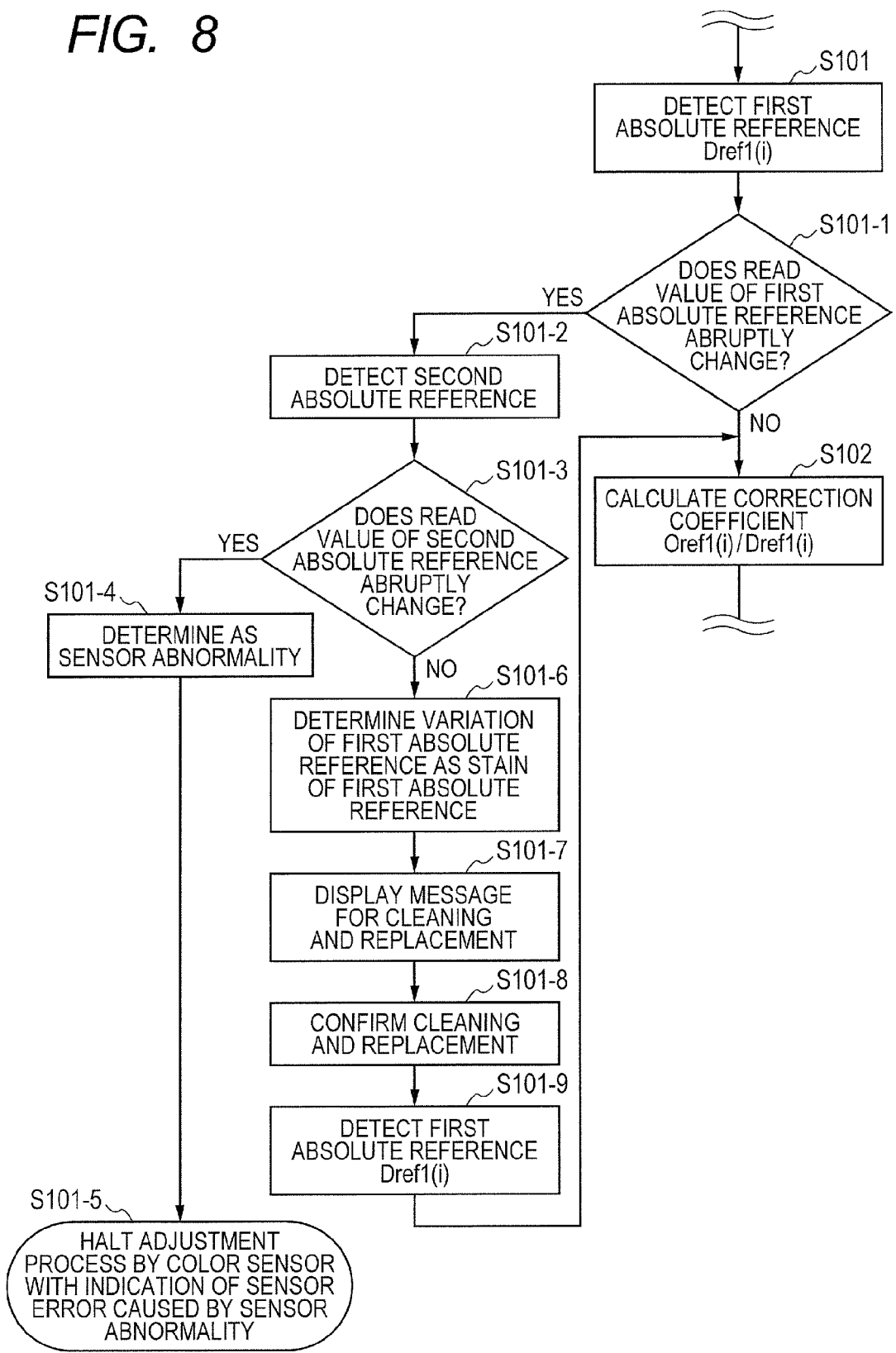
FIG. 8 is a flowchart of a process of detecting a sensor abnormality and a white reference plate according to the sixth embodiment.

In a sixth embodiment of the present invention, there is described a system that detects, in the first adjustment process, a sensor abnormality or an excessive stain on the white reference plate that affects the color measurement accuracy, and displays a notification or prompts removal of the stain. The sixth embodiment is described in detail with reference to a flowchart illustrated in FIG. 8 for describing the detection of the abnormality in the color sensor 42 or the white reference plate and a countermeasure against the abnormality. The process of the sixth embodiment is executed between the process of Step S101 and the process of Step S102 of FIG. 4 described in the first embodiment, and hence only the processes related to the sixth embodiment is described as illustrated in FIG. 8. The processes of the sixth embodiment described below can also be applied to the case of using the density sensor 42.

Firstly, the CPU 56 stores a detection result Dref1($m$) of the first white reference plate 43 in the first adjustment process and a detection result Dref2($m$) of the second white reference plate 44 in the second adjustment process in the memory 55 of the color sensor 42 as needed. In Step S101-1, the CPU 56 compares the detection result with the previous (i.e., immediately previous) detection result of the first white reference plate 43 stored in the memory 55 in the first adjustment process, and determines whether or not there is a change equal to or larger than a given threshold value. That is, the CPU 56 determines whether or not the read value of the first absolute reference has been abruptly changed. When it is determined that there is a change equal to or larger than the threshold value in Step S101-1, the CPU 56 determines that the read value of the first absolute reference has been abruptly changed, and assuming that there is a sensor abnormality or a stain adhered to the first white reference plate 43, starts Step S101-2 and the subsequent steps that are features of the sixth embodiment. In Step S101-2, the CPU 56 detects the second white reference plate 44 by the density sensor 42 or the color sensor 42, and in Step S101-3, compares the detection result with the previous (i.e., immediately previous) detection result of the second white reference plate 44 stored in the memory 55. That is, in Step S101-3, the CPU 56 determines whether or not the read value of the second absolute reference has been abruptly changed.

When it is determined that there is a change equal to or larger (or larger) than the threshold value as a result of the comparison in Step S101-3, the CPU 56 determines that the read value of the second absolute reference has been abruptly changed, and determines that there is a sensor abnormality in Step S101-4. The sensor abnormality may be, for example, an abnormality of the illumination or an abnormality on the light receiving side (the charge accumulation sensor 54 including an RGB on-chip filter or the line sensor 181). In Step S101-5, the CPU 56 displays, on the display unit 602, an error message indicating a sensor error due to the sensor abnormality, and halts the process of adjusting the color sensor 42.

When it is determined that the change is smaller (or equal to or smaller) than the threshold value as a result of the comparison in Step S101-3, the CPU 56 determines that the read value of the second absolute reference has not been abruptly changed, and in Step S101-6, determines that there is a variation of the first white reference plate 43, for example, there is an excessive discoloring or stain on the first white reference plate 43. In Step S101-7, the CPU 56 displays, on the display unit 602, a message prompting a cleaning or a replacement of the first white reference plate 43. In Step S101-8, the CPU 56 confirms the cleaning or the replacement of the first white reference plate 43 with new one, and in Step S101-9, detects the first white reference plate 43 again by the density sensor 42 or the color sensor 42. The CPU 56 then starts the first adjustment process again from Step S102 of the first adjustment process.

The unique effect of the sixth embodiment is that an abnormality of the density sensor, the color sensor, or the white reference can be detected from the process of adjusting the density sensor or the color sensor. By displaying the result of detecting the abnormality on the image forming apparatus main body to notify a user or a service engineer of the abnormality, a countermeasure against the abnormality can be taken in a rapid manner, and as a result, the reliability of the correction by using the density sensor or the color sensor can be enhanced. That is, even when there is discoloring of the first white reference plate 43, such as yellowing, while continuously using the first white reference plate 43, the cleaning or the replacement of the first white reference plate 43 can be prompted or the user can be notified of a message indicating a sensor error depending on the detection result of the density sensor 42 or the color sensor 42.

According to the sixth embodiment, the accuracy in detecting the density or the chromaticity by the sensor can be enhanced by performing the correction of the sensor output with high accuracy.

The present invention can be applied to an inkjet printer in the same manner, and the same effects can be achieved in this case as well.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-040341, filed Feb. 27, 2012, which is hereby incorporated by reference herein in its entirety.

What is claimed is:

1. A color image forming apparatus, comprising:
an image forming unit configured to form a toner image on a transfer material;
a fixing device configured to fix the toner image formed on the transfer material by the image forming unit;
a detector configured to detect the toner image fixed onto the transfer material by the fixing device;
a first reference configured to correct a detection result of the toner image detected by the detector; and
a correction unit configured to calculate a first correction result by correcting a detection result of the first reference detected by the detector, based on a detection result of a second reference detected by the detector, calculate a second correction result by correcting a detection result of the toner image detected by the detector, based on the first correction result, and control density or chromaticity of the toner image formed by the image forming unit based on the second correction result,
wherein the first reference is arranged to oppose the detector,
wherein the second reference is capable of being placed at a place where the first reference is removed, and
wherein after the second reference is detected by the detector, the first reference is capable of being placed at the place where the first reference was removed after the second reference is removed.

2. A color image forming apparatus according to claim 1, wherein the second reference comprises a sheet and is detected by the detector by being conveyed to a position of the detector.

3. A color image forming apparatus according to claim 1, wherein the detector is detachably mounted on the color image forming apparatus, and
wherein the detector is electrically connected to the color image forming apparatus via a flat cable.

4. A color image forming apparatus according to claim 3, wherein the detector is capable of detecting the second reference in a state in which the detector is removed from the color image forming apparatus.

5. A color image forming apparatus according to claim 1, wherein the detector is capable of detecting a stain on the first reference based on the detection results of the first and second references detected by the detector.

6. A color image forming apparatus according to claim 1, wherein an abnormality of the detector is capable of being detected based on the detection results of the first and second references detected by the detector.

7. A color image forming apparatus according to claim 1, wherein the detection result of the second reference for correcting the first reference is stored in a storing unit, and
wherein the correction unit corrects the detection result of the first reference based on the detection result of the second reference stored in the storing unit.

8. A color image forming apparatus according to claim 1, wherein the detector includes a spectrum color sensor.

9. A color image forming apparatus, comprising:
an image forming unit configured to form a toner image on a transfer material;
a fixing device configured to fix the toner image formed on the transfer material by the image forming unit;
a detector configured to detect the toner image fixed onto the transfer material by the fixing device;
a first reference configured to correct a detection result of the toner image detected by the detector; and
a correction unit configured to correct, based on a detection result of the first reference detected by the detector, the detection result of the toner image by the detector to obtain a corrected detection result of the toner image,
wherein the color image forming apparatus is configured to control a density or a chromaticity of the toner image formed by the image forming unit based on the corrected detection result of the toner image corrected by the correction unit,
wherein the correction unit corrects, based on a detection result of a second reference detected by the detector, the detection result of the first reference detected by the detector,
wherein the second reference is capable of being placed at a place where the first reference is removed, and
wherein after the second reference is detected by the detector, the first reference is capable of being placed at the place where the first reference was removed after the second reference is removed.

10. A color image forming apparatus, comprising:
an image forming unit configured to form a toner image on a transfer material;
a fixing device configured to fix the toner image formed on the transfer material by the image forming unit;
a detector configured to detect the toner image fixed onto the transfer material by the fixing device;
a first reference configured to correct a detection result of the toner image detected by the detector; and
a correction unit configured to calculate a first correction result by correcting a detection result of the first reference detected by the detector, based on a detection result of a second reference detected by the detector, calculate a second correction result by correcting a detection result of the toner image detected by the detector, based on the first correction result, and control density or chromaticity of the toner image formed by the image forming unit based on the second correction result,
wherein the detector is detachably mounted on the color image forming apparatus,
wherein the detector is electrically connected to the color image forming apparatus via a flat cable, and
wherein the detector is capable of detecting the second reference in a state in which the detector is removed from the color image forming apparatus.

* * * * *